United States Patent
Schuettenberg

(10) Patent No.: US 7,611,159 B2
(45) Date of Patent: *Nov. 3, 2009

(54) METHOD FOR SECURING SADDLEMOUNT TO VEHICLE

(75) Inventor: Donald W. Schuettenberg, Antioch, IL (US)

(73) Assignee: ATC Leasing Company, LLC, Pleasant Prairie, WI (US)

( * ) Notice: Subject to any disclaimer, the term of this patent is extended or adjusted under 35 U.S.C. 154(b) by 177 days.

This patent is subject to a terminal disclaimer.

(21) Appl. No.: 11/618,054

(22) Filed: Dec. 29, 2006

(65) Prior Publication Data

US 2008/0157506 A1 Jul. 3, 2008

(51) Int. Cl.
*B60D 1/24* (2006.01)
(52) U.S. Cl. .................... 280/402; 414/563
(58) Field of Classification Search ........ 280/402, 280/407.1, 495, 496; 414/563
See application file for complete search history.

(56) References Cited

U.S. PATENT DOCUMENTS

| | | | | |
|---|---|---|---|---|
| 2,152,279 A | * | 3/1939 | Randall et al. | 384/422 |
| 2,411,411 A | * | 11/1946 | Blair et al. | 280/402 |
| 2,436,485 A | * | 2/1948 | Roxy | 280/402 |
| 2,647,760 A | * | 8/1953 | Mettetal Jr. | 280/402 |
| 3,020,064 A | * | 2/1962 | Hinton | 280/402 |
| 4,543,030 A | * | 9/1985 | Hawkins | 414/563 |
| 4,555,214 A | | 11/1985 | Morton | |
| 4,842,472 A | * | 6/1989 | Plant | 414/563 |
| 4,867,468 A | * | 9/1989 | Paul et al. | 280/402 |
| 4,949,985 A | | 8/1990 | Lichter | |
| 5,722,677 A | * | 3/1998 | Lichter et al. | 280/402 |
| 5,845,920 A | * | 12/1998 | Hill | 280/402 |

* cited by examiner

*Primary Examiner*—Tony H. Winner
(74) *Attorney, Agent, or Firm*—Vorys, Sater, Seymour & Pease LLP; William H. Oldach, III

(57) ABSTRACT

A method for transporting vehicles is disclosed. The method uses inner or outer securing plates, or both, in cooperation with frame rails of a towing vehicle to secure a towing device to the towing vehicle. Towing vehicles typically include a frame that is made from strong robust channels on both sides of the towing vehicle. The securing plates generally have a right-angle bend in order to butt up against a web or a flange of the channels. This prevents inner or outer movement of the securing plates and allows users to secure a towing saddle and its load without using extended U-bolts around the channels.

20 Claims, 7 Drawing Sheets

METHOD FOR SECURING SADDLEMOUNT TO VEHICLE

FIELD OF THE INVENTION

This invention generally relates to apparatuses and methods for transportation of multiple vehicles in tandem from one destination to another. The invention may also be used in the field of towing vehicles generally.

BACKGROUND OF THE INVENTION

The economy of the United States, if not of the world, depends to a great extent on fleets of large trucks for the distribution of goods, such as foods, consumer products, durable goods, and even industrial equipment. There are many manufacturers of such trucks, which concern primarily, but are not limited to, class 7 or class 8 over-the-road trucks. Once these trucks are manufactured, they require shipment or transportation either to the carrier or other company for whom the truck was made, or to a dealer who sells or leases these trucks. The most obvious method to transport these trucks is by driving them directly to their destination. This method has disadvantages, at least because each truck requires a driver, who must be paid for his or her services and for whom return transportation must be arranged.

In order to overcome the necessity of a driver for delivering each truck, a variety of techniques have been devised to use a first truck that will carry or tow one or more additional trucks to the desired destination. One example is shown in U.S. Pat. No. 4,555,214. This patent discloses a tow bar that attaches to the fifth wheel of both the towing vehicle and the towed vehicle. The towed vehicle is towed in a rear-ward fashion behind the front vehicle. Using this technique, the towed vehicle is exposed to the full force of the air that is encountered during the tow. Any aerodynamic surfaces of the towed vehicle will be subjected to reverse stresses, i.e., the wind will impose loads on the truck at 180° from the direction expected during the design of the truck. Thus, the roof cap, side fairings, and any additional fairings, such as side and chassis fairings, should be braced or buttressed for the trip. This adds additional cost to the delivery of the truck. In addition, it is not clear that, even using both fifth wheels, the towed truck will have sufficient freedom of movement to be able to rotate slightly during turns.

Another technique is disclosed in U.S. Pat. No. 4,949,985, in which a vehicle is towed or transported while facing forward. The technique involves hoisting the front axle of a towed vehicle onto the rear of a towing vehicle. The technique works well, but one disadvantage is that the forward portion of the towed vehicle must be raised a considerable height in order to mate with a towing saddle that is secured to the towing vehicle. Another disadvantage is that the towing saddle itself is secured to the towing vehicle by means of long U-bolts which extend around and under the vehicle frame members. These frame members are typically elongated C-channels with solid webs facing outward and the hollow portions and flanges of the "C"s facing inwardly.

One arrangement is shown in FIG. 1. A combination saddle 10 includes a saddle head 12, J-claws 14 and J-bolts 16, and a kingpin 18. Saddle head 12 pivots on kingpin 18 to allow movement of the towed vehicle for turns and other maneuvers. The towed vehicle is secured by its front axle 20 to the saddle head. Combination saddle 10 and mounting plates 26 are secured to the frame 24 members of the towing vehicle by U-bolts 28. Each mounting plate 26 typically has four orifices or slots, positioning two slots on each side of frame member 24 and using two U-bolts on each side of the vehicle, for a total of four, of which two are depicted in FIG. 1. U-bolts 28 are positioned to surround the towing vehicle frame members 22. These frame members are typically the C-shaped channels discussed above, having a channel body or web 22a and flanges 22b. The flanges typically face inwardly and also face each other, as shown.

The U-bolts are secured by nuts 30 and preferably locking washers 32. It is preferred to use expendable materials, such as wood, between frame 26 and the truck frame 24, to prevent wear and chafing. This arrangement requires very long U-bolts, which may be expensive. In addition, there is potential for chafing and wear along the entire length of the bolts.

What is needed is an apparatus and method for securing a towing apparatus, such as a saddlemount, to a towing or transporting vehicle. The method should not require long U-bolts and should be easy to install. The invention provides such an improved apparatus and method. These and other advantages of the invention, as well as additional inventive features, will be apparent from the description of the invention provided herein.

BRIEF SUMMARY OF THE INVENTION

One aspect is a method of transporting a vehicle. The method includes steps of furnishing a towing vehicle having two frame members, each frame member having a top flange, a web, and a bottom flange. The method also includes steps of placing a first securing plate adjacent a first frame member on a first side of the towing vehicle and a second securing plate adjacent a second frame member on a second side of the towing vehicle, placing a combination saddle or mounting plates for a combination saddle atop the frame members, bolting the combination saddle and securing plates in place using only a top flange and sides of the web of each frame member, wherein at least a portion of the securing plates are held underneath the top flanges, and securing a second vehicle to the towing vehicle.

Another aspect is a method of transporting a vehicle. The method includes steps of furnishing a towing vehicle having two frame members, each frame member having a top flange, a web, and a bottom flange. The method also includes steps of furnishing first and second securing plates, the first and second securing plates each having a right-angle bend, placing a portion of the first and second plates under the top flanges and placing and a combination saddle atop the frame members, securing the first and second securing plates and the combination saddle to the frame members, using not more than the top flange and sides of the web of each frame member, wherein at least a portion the first and second securing plates is held underneath the top flanges. The method also includes a step of securing a second vehicle to the towing vehicle.

Yet another aspect is a method of transporting a vehicle. The method includes steps of furnishing a towing vehicle having two frame members, each frame member having a top flange, a web, and a bottom flange and furnishing first and second securing plates, the first and second securing plates each having a right-angle bend. The method also includes steps of placing wood blocks atop the frame members, placing a portion of the first and second plates under the frame members and placing and a saddlemount atop the frame members, securing the first and second securing plates and the towing saddle to the frame members, wherein at least a portion the first and second securing plates is held underneath the frame members, and then securing a second vehicle to the towing vehicle.

Yet another aspect is a method of transporting a vehicle. The method includes steps of furnishing a towing vehicle having two frame members, each frame member having a top flange, a web, and a bottom flange. The method also includes steps of furnishing first, second, third and fourth securing plates, each securing plate having a right-angle bend; placing a portion of the first and second plates under the top flanges; placing a portion of the third and fourth securing plates atop the top flanges; bolting the securing plates and a saddlemount to the frame members, using not more than the top flange and sides of the web of each frame member, wherein the securing plates prevent lateral movement of the saddlemount; and securing a second vehicle to the towing vehicle.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PRESENTLY PREFERRED EMBODIMENTS

As noted above, there are many ways to secure mounting devices, such as saddlemounts, for towing operations to vehicles that will accomplish towing or will themselves be towed. These devices typically mount to a towing vehicle by being bolted about the truck frame with two or four bolts. The term saddlemount is meant generally to include devices known as combination saddles, frame saddles, pyramid saddles, low profile saddles, and the like. Such saddlemounts typically mount to an axle of the vehicle in tow, i.e., the towed vehicle.

Figure 1:
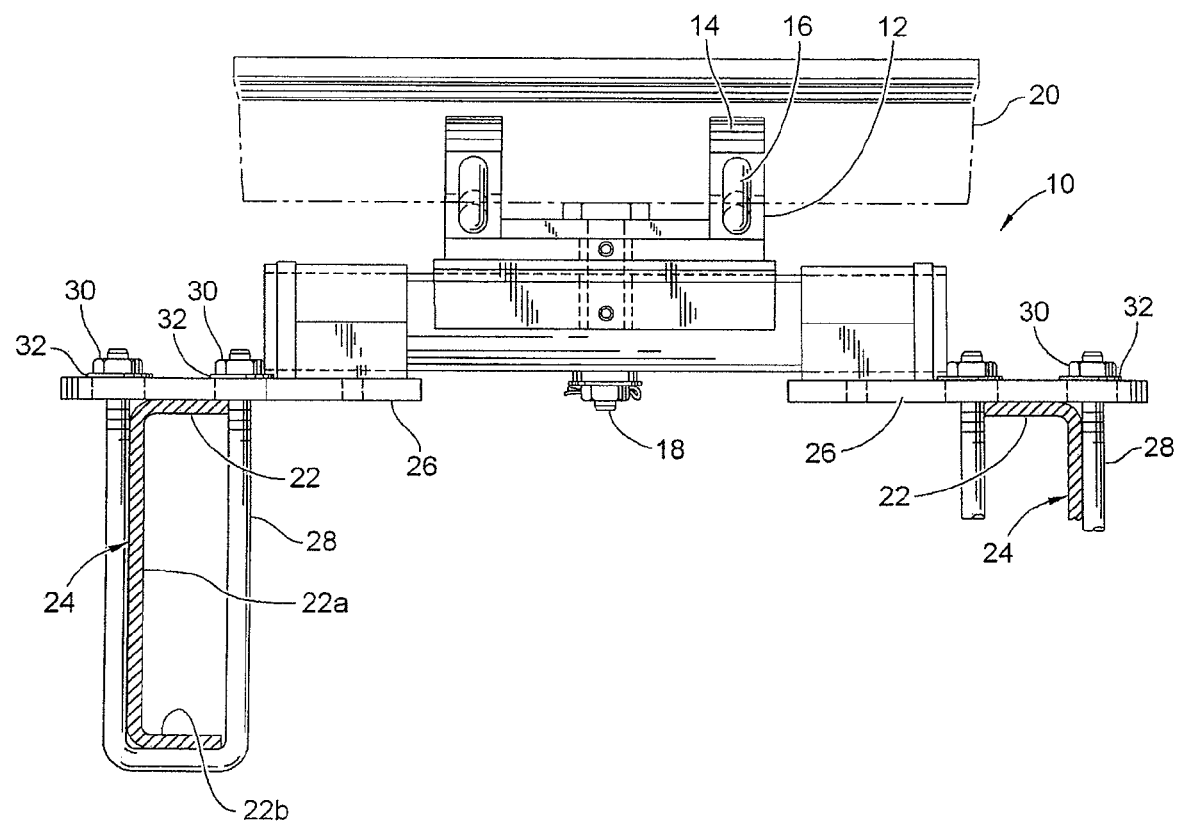
FIG. 1 is a partial cross-section view of a prior art apparatus for securing a towing saddle to a towing vehicle.
Figure 2:
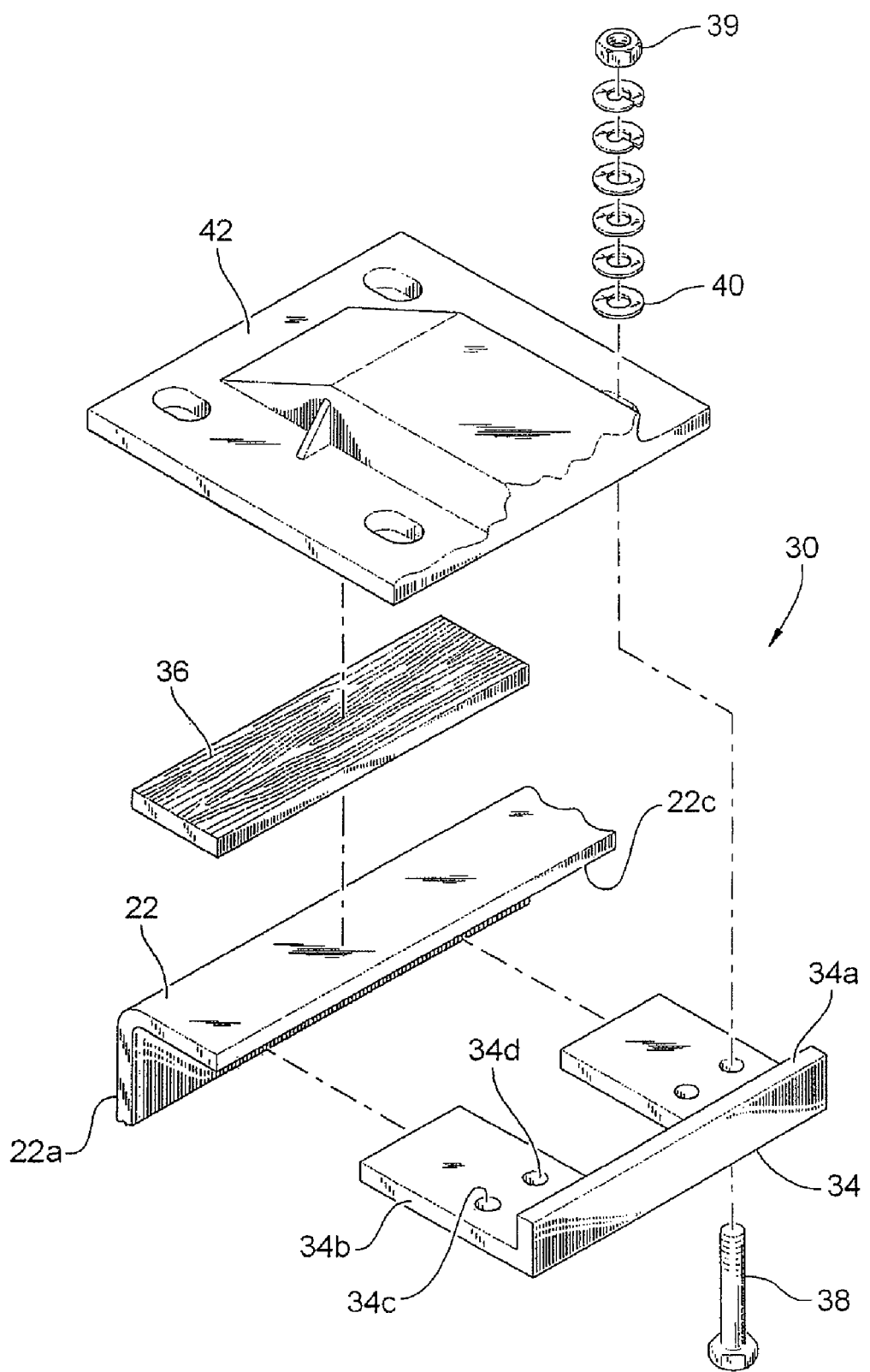
FIG. 2 is a rear view of an improved apparatus for securing a towing device to a vehicle.

One technique for securing a mounting device is depicted in FIG. 2. In this technique, a right angle plate 34 is configured to fit under the top flange 22c of left channel frame member 22. Right angle plate 34 includes two under-flange sections 34b and four orifices or openings 34b, 34c for bolting to frame member 22. This particular embodiment is intended to fit both newer and older models of frame saddles, and thus has two sets of orifices, outer two orifices 34c and the inner two orifices 34d. Only one set will be used in any particular application, in this example outer orifices 34c are used. Right angle plate horizontal portion 34b is placed underneath top flange 22c, and is preferably butted against channel web 22a. A piece of wood 36 or other protective material, typically at least ½ inch thick, may be used atop top flange 22c. A towing device 42, such as a combination saddle, is then placed atop the wood or the top flange, and the towing device 42 and the right angle plate are bolted together using four bolts 38, nuts 39 and preferably locking washers 40.

The flat horizontal portions 34b of right angle plate 34, bolted against the flange of frame member 22, prevent vertical movement of the right angle plate and also prevent vertical movement of the towing device 42. The upright vertical portions 34a of right angle plate 34 prevent movement of the right angle plate to the left in FIG. 2, which depicts, from the rear, the left side of the towing vehicle. If the bolt and nut remain tight, there will be no movement of the towing device 42 or the right angle plate 34. If there is a slight loosening, the right angle plate cannot move left with respect to channel web 22a because the angle plate butts against the web. Accordingly, on the left side of the vehicle, this configuration prevents leftward movement of plate 34 and thus of towing device 42. On the right side, the situation is reversed, with the right side having the mirror-image configuration of the right angle plate 34 and frame member 22. On the right side, the right angle plate prevents movement to the right of the right angle plate with respect to the channel web. Accordingly, this configuration prevents upward and outward movement of the right angle pieces and thus also prevents upward and outward movement of the towing device 42.

Figure 3:
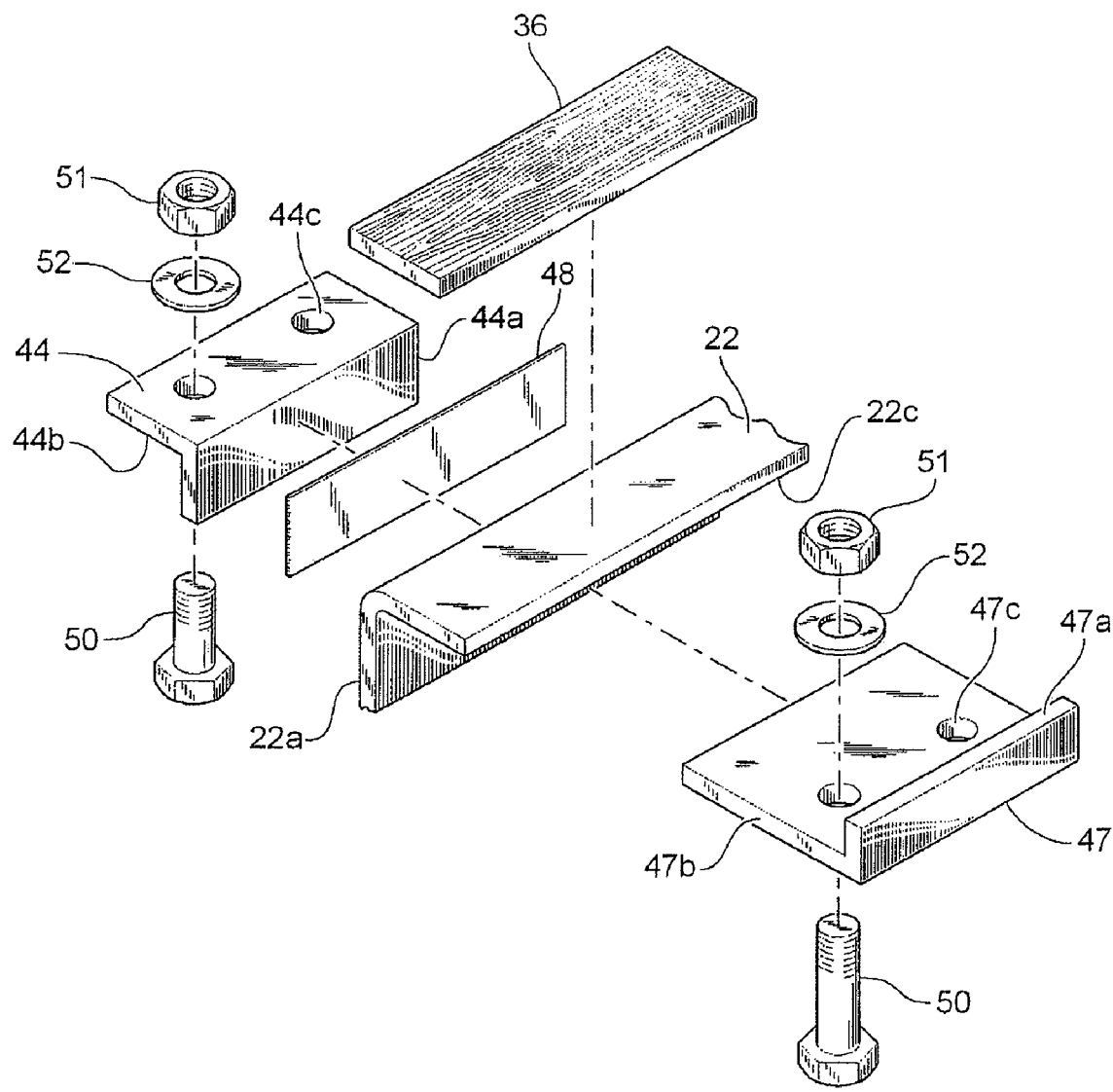
FIG. 3 is a second embodiment of an improved apparatus for securing a towing device to a towing vehicle.

Another embodiment or method may add additional plates to prevent inward movement of the towing device. Equipment for such a method is depicted in FIG. 3. In this method, inner right angle plate 47 with vertical portion 47a is placed under upper flange 22c of left frame channel 22, and the horizontal portion 47b is butted up against the inner face of web 22a. At least one layer of protective material 48, such as kraft paper or corrugated paper, is placed on the outer face of web 22a. Outer right angle plate 44 is placed adjacent protective material 48. Wood 36 may be placed atop flange 22c, and a towing device or mount (not shown) is placed atop the wood. The right angle plates are then secured to frame member 22 and the towing device with bolts 50 through orifices 44c, 47c, nuts 51 and locking washers 52. A mirror-image of these devices, not shown, is also placed on the right side of the towing vehicle.

As mentioned, inner right angle plate 47 is unable to move to the left because the plate butts against web 22a. This plate is also unable to move upward because horizontal portion 47b butts against the underneath of flange 22c. On the right side, the other inner right angle plate prevents movement to the right and also prevents upward movement. On the left side, depicted in FIG. 3, outer right angle plate 44 prevents movement to the right, or inner movement, because it is butted up against the outer surface of web 22a or antifretting material 48, which is butted up against the outer surface of web 22a. On the right side, not shown, a mirror-image outer right angle plate prevents movement to the left, inner movement, in a similar manner. The right angle plates thus secure a towing device or mount and prevent its movement during towing or vehicle transportation.

Figure 4:
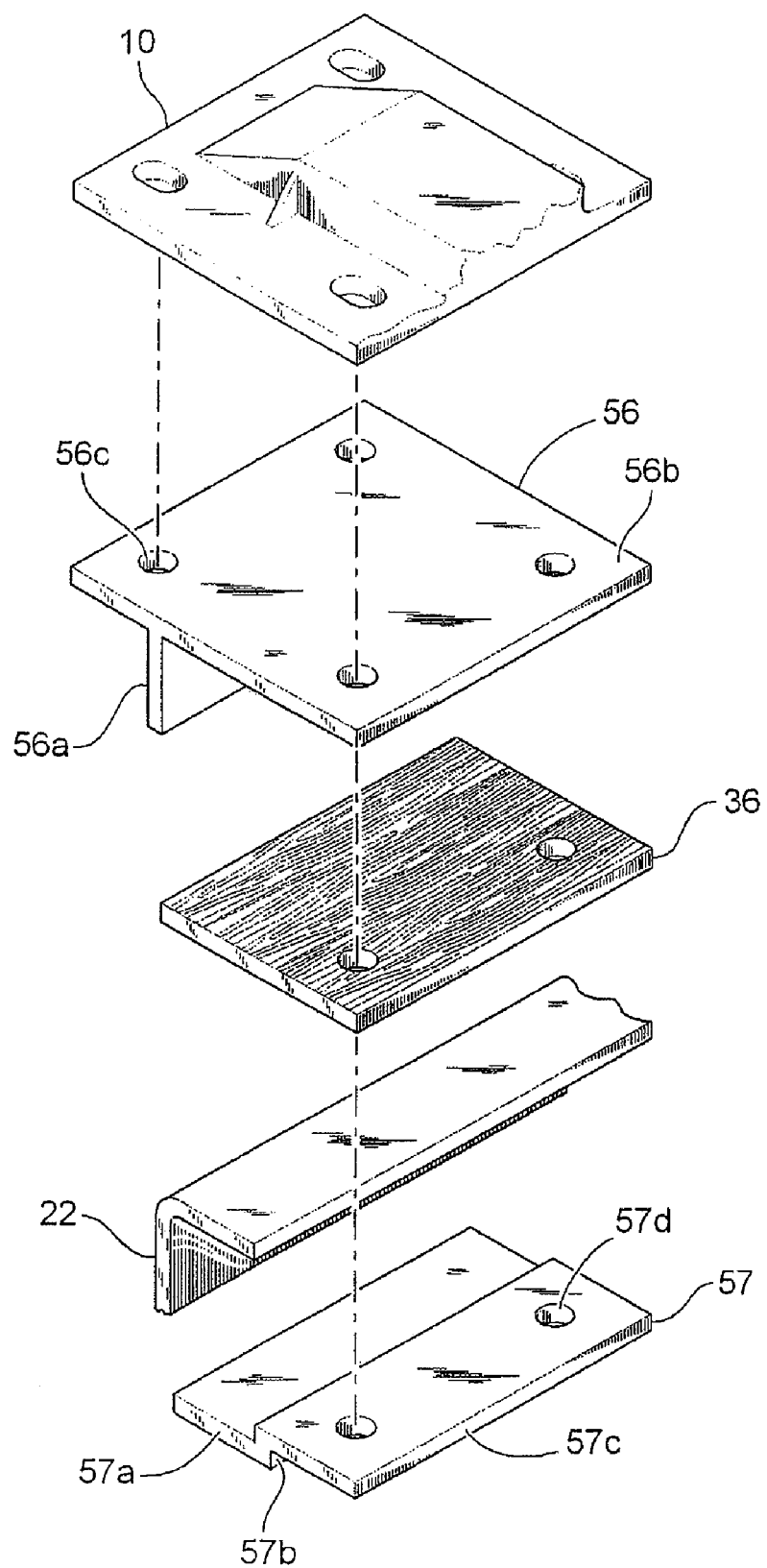
FIG. 4 is a another embodiment of an improved apparatus for securing a towing vehicle to a towed vehicle.

There are many configurations of plates that may be bolted to a truck frame to secure a towing device or towing mount. One additional configuration is depicted in FIG. 4. In this configuration, an inner securing plate 57 includes a first horizontal portion 57a to be placed under an inner surface of the frame member 22 top flange. Plate 57 also includes a vertical portion 57b and a second horizontal portion 57c with orifices 57d. Outer securing plate 56 includes a vertical portion 56a for placement against the outer web surface of frame member 22, and a horizontal portion 56b for placement about frame member 22. Protective material, such as wood, may be placed atop the upper flange of frame member 22, between the frame member and the securing plate, before the outer securing plate is placed. A towing device, such as a combination saddle 10, is then placed atop the securing plates 56 on both sides of the towing vehicle.

Figure 5:
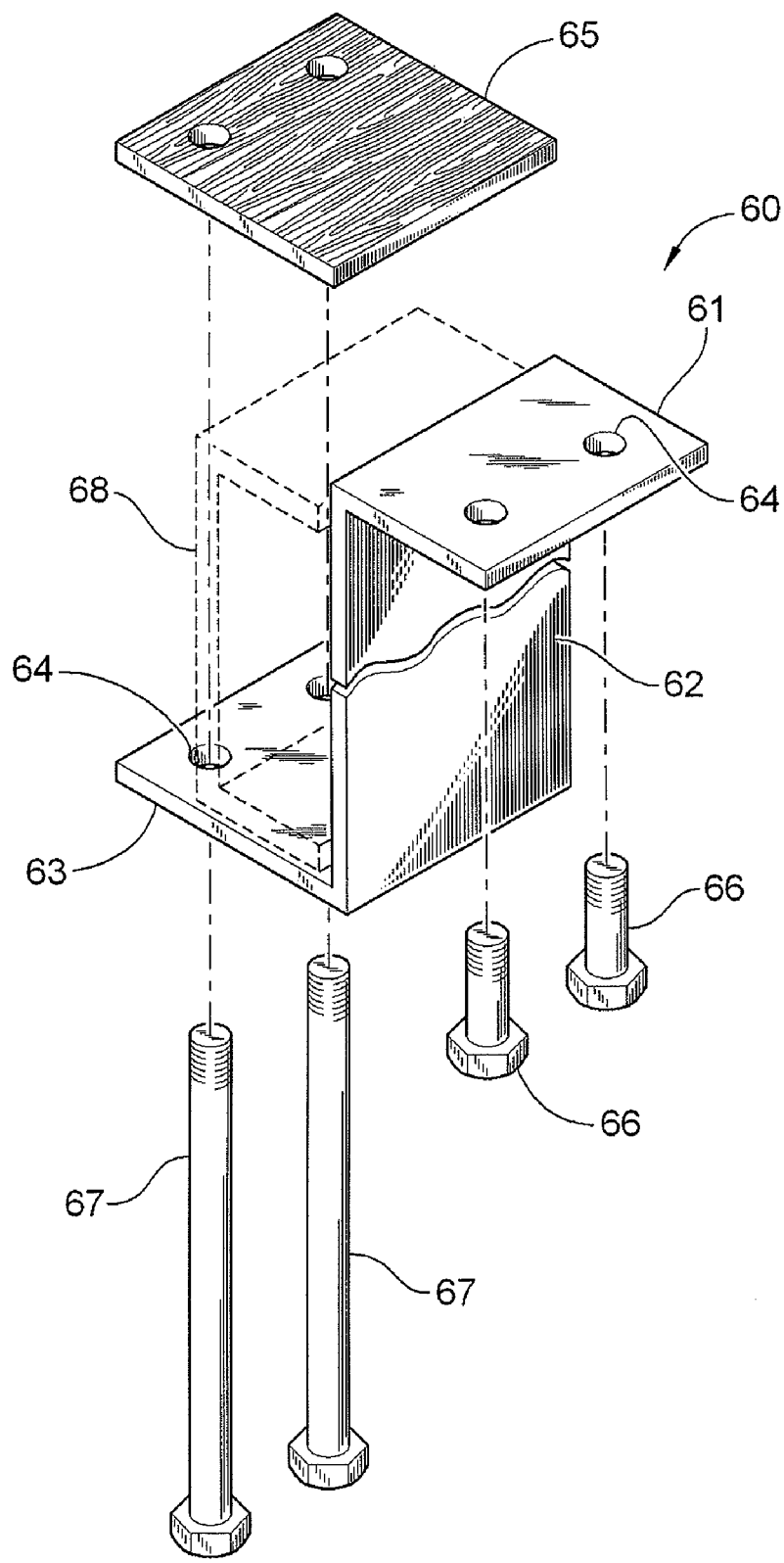
FIGS. 5-6 depict additional embodiments of securing plates.
Figure 6:
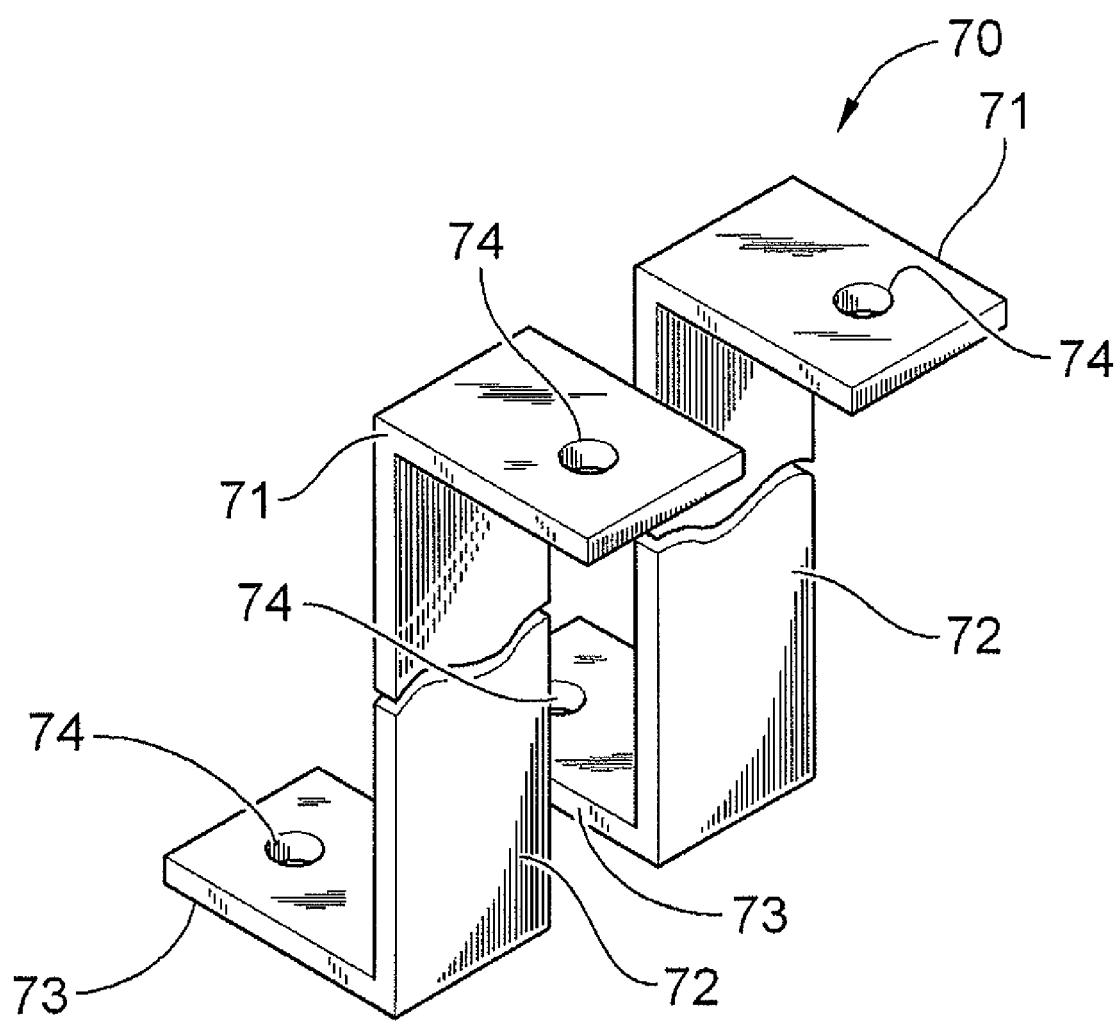

Additional embodiments of security plates are depicted in FIGS. 5-6. In FIG. 5, securing plate 60 is configured for fitting around a truck frame member that is not limited to a channel. For instance, truck frame members may include structural members made from hollow tubing in the form of a square or rectangle with rounded corners. Securing plate 60 is configured so that vertical portion 62 is somewhat longer than the truck frame member 68 and horizontal portion 63 will fit underneath the truck frame member and will extend with bolt holes or orifices 64 as shown beyond the frame member. Horizontal portion 61 will be bolted to a saddlemount (not shown) via orifices 64 and bolts. Two bolts 66 are preferably about 4 inches long, and two additional bolts 67 are preferably about 12-14 inches long, so the longer bolts can span the truck frame. Protective material 65, such as wood about ½ inch to 2 inches thick, is placed between the truck frame 68 and a saddlemount or other device used to secure the towed truck to a towing truck.

FIG. 6 depicts another embodiment 70 of securing plates. This embodiment is similar to that depicted in FIG. 5, but is split into two portions. Each plate 70 includes a first horizontal portion 71 with orifices 74, a vertical portion 72 that is sufficiently long to span a truck frame, and a second horizontal portion 73, also with at least one orifice 74. This embodiment is preferably made from steel and has proportions suitable for mounting on a heavy-duty truck.

Figure 7:
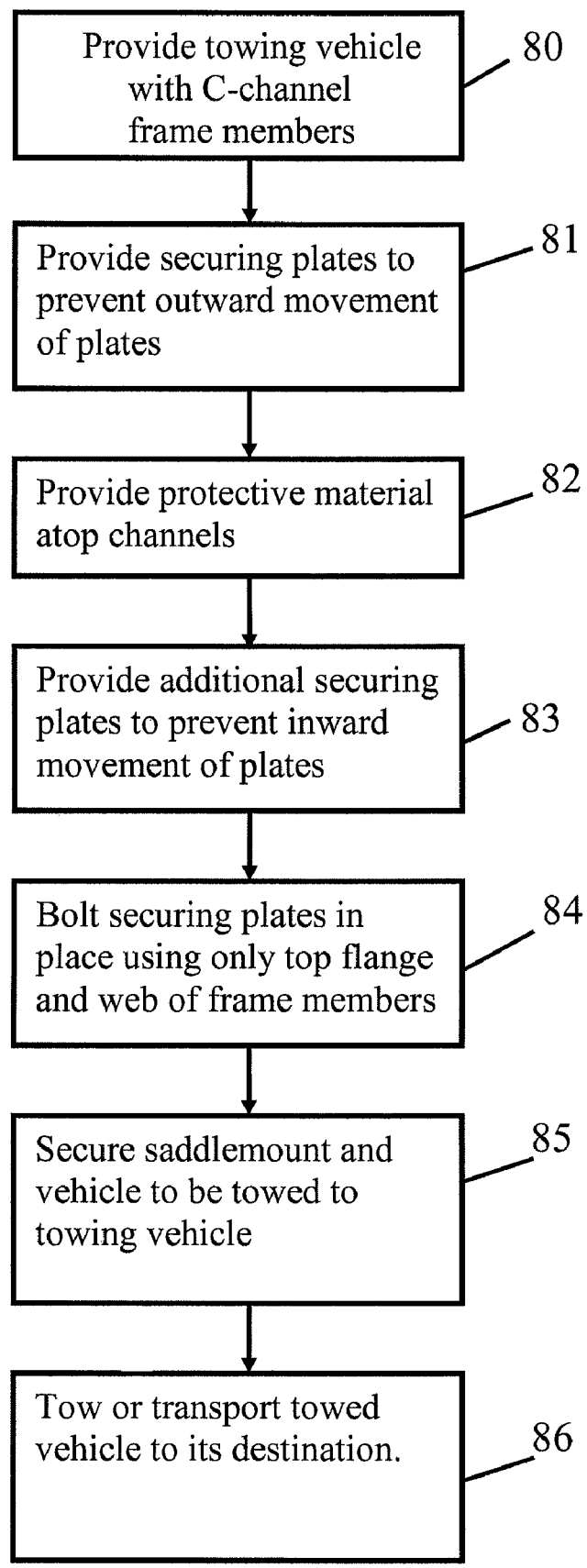
FIG. 7 is a flow chart for a method of transporting a vehicle.

One method for transporting a vehicle using the securing plates disclosed above is depicted in the flowchart of FIG. 7. A first step 80 is to furnish a towing vehicle with C-shaped frame members, i.e., structural steel channels that are typically used in manufacturing truck frames. The second step is to provide 81 securing plates that prevent outward movement of the plates themselves once the plates are secured to frame channels. If the securing plates are suitably shaped, such as an L-shaped or right-angled piece of structural steel (or a weldment), the plates may prevent lateral movement as well as vertical (up-and-down) movement when secured under the top flanges of the frame channels.

It is also desirable to prevent wear and fretting by placing 82 protective material between the channels and at least some of the securing plates. Suitable protective materials may includes wooden blocks, boards, and cardboard, such as large or thick pieces of cardboard, plain or corrugated. Other suitable materials may be used. If desired, additional securing plates may be provided 83, the additional securing plates suitable for preventing inward movement of the additional securing plates, and also helpful to prevent inward movement of the towing apparatus or portions thereof.

Once the pieces are in place, they should be bolted 84 or otherwise secured to the towing truck. Using the structural pieces described above, only the top flange and the web, preferably only the upper web, of the frame members will be used to secure and react to the loads during transport. Once the plates are in place, a saddlemount, such as a combination saddle or other saddlemount, or portions thereof, may be secured 85 to the towing vehicle. The vehicle to be towed is then secured to the combination saddle or to the towing vehicle, and the towed truck is transported or towed 86 to its destination.

The securing plates are important in helping to hold a saddlemount or other securing plate in place. Accordingly, they should be sturdy and robust, with the ability to withstand normal use and wear in field operations. Steel is the preferred material for both strength and cost reasons. Since the securing plates will normally be weldments, two or three pieces joined together, the weld and any heat treating necessary for adequate strength should be performed to professional and industry standards. The securing plates, preferably with thicknesses of at least one inch, and likely more than one inch of steel, may lessen their weight by one or more of the weight savings techniques described above and depicted in the drawings. That is, the long portion of the "L" shape of the plate may be made in two sections, with a gap between them. The gap represents a weight savings, which may be useful for return trips of the towing equipment. Other embodiments may have other weight-saving techniques.

Embodiments of the present invention contemplate the use of large C-shaped channels as frame rails in vehicles used for truck transport. It is possible that other shapes may be used, such as I-beams, wide-flange beams, or hollow, rounded-square tubing. The U-bolts that are presently used to secure a saddle mount to a channel could also be used to secure a saddle mount to any of these shapes. Modern combination saddles having a large secure base and a rotating saddle head are preferred for towing operations. Other, older saddles will work, but combination saddles are preferred.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of transporting a vehicle, the method comprising steps of:

furnishing a towing vehicle having two frame members, each frame member having a top flange, a web, and a bottom flange;

placing a first securing plate adjacent a first frame member on a first side of the towing vehicle and a second securing plate adjacent a second frame member on a second side of the towing vehicle;

placing a combination saddle or mounting plates for a combination saddle atop the frame members;

bolting the towing saddle and securing plates in place using only a top flange and sides of the web of each frame member, wherein at least a portion of the securing plates are held underneath the top flanges; and securing a second vehicle to the towing vehicle.

2. The method of claim 1, where the two frame members comprise two channels having inwardly-facing flanges that also face each other.

3. The method of claim 1, wherein each securing plate is in the general shape of an L, a portion of a long side of the L is configured for holding beneath the top flange on the first and second sides, and optionally, the long side of the L is split into two portions.

4. The method of claim 1, wherein the first and second securing plates prevent lateral movement of the towing saddle in at least one direction by butting against the webs.

5. The method of claim 1, before the step of placing a combination saddle or mounting plates, further comprising a step of placing wood blocks atop the frame members, and optionally placing protective materials between the frame members and the securing plates.

6. The method of claim 1, before the step of placing a combination saddle or mounting plates, further comprising a step of placing a third and a fourth securing plate adjacent the first and second frame members, wherein the third and fourth securing plates cooperate with the first and second securing plates to prevent lateral movement of the towing saddle by butting against the webs.

7. The method of claim 1, before the step of placing a combination saddle or mounting plates, further comprising a step of placing a third and a fourth securing plate adjacent the first and second frame members, an angle of the third and fourth securing plates adjacent webs of the frame members, wherein the third and fourth securing plates cooperate with the first and second securing plates to prevent lateral movement of the towing saddle by butting against the webs.

8. The method of claim 1, further comprising transporting the second vehicle.

9. A method of transporting a vehicle, the method comprising steps of:

furnishing a towing vehicle having two frame members, each frame member having a top flange, a web, and a bottom flange;

furnishing first and second securing plates, the first and second securing plates each having a right-angle bend;

placing a portion of the first and second plates under the top flanges and placing and a combination saddle atop the frame members;

securing the first and second securing plates and the combination saddle to the frame members, using not more than the top flange and sides of the web of each frame member, wherein at least a portion the first and second securing plates is held underneath the top flanges; and securing a second vehicle to the towing vehicle.

10. The method of claim 9, further comprising, before the step of securing the first and second securing plates, placing wood blocks atop the frame members.

11. The method of claim 9, further comprising before the step of placing, furnishing third and fourth securing plates, the third and fourth securing plates each having a right angle bend, and wherein the step of placing comprises placing a portion of the first and second securing plates under the top flanges, placing the third and fourth securing plates atop the top flanges, and placing a towing saddle atop the third and fourth securing plates.

12. The method of claim 11, wherein the first and second plates are configured to resist outward movement of the towing saddle and the third and fourth plates are configured to resist inward movement of the towing saddle.

13. The method of claim 9, further comprising before the step of placing, furnishing third and fourth securing plates, the third and fourth securing plates each having a right angle bend, and wherein the step of placing comprises placing the first and second securing plates under the top flanges, placing the third and fourth securing plates atop the top flanges, and placing a combination saddle atop the third and fourth securing plates, wherein the third and fourth securing plates cooperate with the first and second securing plates to prevent lateral movement of the towing saddle by butting against the webs.

14. The method of claim 9, further comprising transporting the second vehicle.

15. A method of transporting a vehicle, the method comprising steps of:

furnishing a towing vehicle having two frame members;

furnishing first and second securing plates, the first and second securing plates each having a right-angle bend;

placing wood blocks atop the frame members;

placing a portion of the first and second plates under the frame members and placing and a saddlemount atop the first and second plates;

securing the first and second securing plates and the saddlemount to the frame members, wherein at least a portion the first and second securing plates is held underneath the frame members; and securing a second vehicle to the towing vehicle.

16. The method of claim 15, further comprising towing the second vehicle.

17. A method of transporting a vehicle, the method comprising steps of:

furnishing a towing vehicle having two frame members, each frame member having a top flange, a web, and a bottom flange;

furnishing first, second, third and fourth securing plates, each securing plate having a right-angle bend;

placing a portion of the first and second plates under the top flanges;

placing a portion of the third and fourth securing plates atop the top flanges;

bolting the securing plates and a saddle mount to the frame members, using not more than the top flange and sides of the web of each frame member, wherein the securing plates prevent lateral movement of the saddlemount; and securing a second vehicle to the towing vehicle.

18. The method of claim 17, further comprising placing wood blocks atop the frame members before the step of placing the third and fourth securing plates atop the top flanges.

19. The method of claim 17, further comprising placing protective material between the frame members and the securing plates.

20. The method of claim 17, further comprising towing the second vehicle.

* * * * *